United States Patent [19]
Schlatmann

[11] Patent Number: 6,049,037
[45] Date of Patent: Apr. 11, 2000

[54] PICTURE DISPLAY DEVICE WITH EMISSION-REDUCING MEANS

[75] Inventor: Paul H. M. Schlatmann, Eindhoven, Netherlands

[73] Assignee: U.S. Philips Corporation, New York, N.Y.

[21] Appl. No.: 09/047,685

[22] Filed: Mar. 25, 1998

[30] Foreign Application Priority Data

Apr. 1, 1997 [EP] European Pat. Off. .............. 97200948

[51] Int. Cl.$^7$ ...................................... H05K 9/00
[52] U.S. Cl. .................... 174/35 MS; 358/245; 358/247; 350/162; 350/165; 52/17
[58] Field of Search ................ 174/35 GL, 35 R, 174/35 MS; 358/245, 247; 350/164, 165, 163; 52/171

[56] References Cited

U.S. PATENT DOCUMENTS

| | | | |
|---|---|---|---|
| 4,381,421 | 4/1983 | Coats et al. ............................ | 174/35 R |
| 4,732,454 | 3/1988 | Saito et al. .............................. | 350/164 |
| 4,874,903 | 10/1989 | Clarke .................................. | 174/35 MS |
| 4,978,812 | 12/1990 | Akeyoshi et al. ................. | 174/35 MS |
| 5,139,850 | 8/1992 | Clarke et al. ........................... | 428/192 |

FOREIGN PATENT DOCUMENTS

WO97/34313  9/1997  WIPO .

*Primary Examiner*—William A. Cuchlinski, Jr.
*Assistant Examiner*—Ronnie Mancho
*Attorney, Agent, or Firm*—F. Brice Faller

[57] ABSTRACT

Emission-reducing shield for a display, including two glass plates. A conducting layer is present on one of the glass plates. The layer is a continuous layer so that there is no Moiré effect. The shield may also have an anti-static coating and an anti-reflection coating.

9 Claims, 2 Drawing Sheets

PICTURE DISPLAY DEVICE WITH EMISSION-REDUCING MEANS

BACKGROUND OF THE INVENTION

The invention relates to a picture display device provided with emission-reducing means which comprise two substantially parallel glass plates enclosing a thermoplastic material and an electrically conducting material.

The invention also relates to a shield with emission-reducing means which is suitable for use in a picture display device, which means comprise two substantially parallel glass plates enclosing a thermoplastic material and an electrically conducting material.

A device of this type is known from U.S. Pat. No. 4,381,421. This patent describes an electromagnetic shield for an electronic apparatus such as, for example a picture display device. The shield has two glass plates enclosing a metal gauze embedded in polyvinyl butyral (PVB). This gauze projects on the sides and is used for suspending the shield. Due to the presence of the metal gauze, the shield protects the internal part of an electronic apparatus from electromagnetic fields. This is necessary to ensure that neighboring apparatuses are not disturbed.

The known picture display device has a considerable drawback. The electromagnetic shield present in this device exhibits the Moiré effect. This produces troublesome patterns in the picture. Moreover, the gauze used is relatively expensive.

OBJECTS AND SUMMARY OF THE INVENTION

It is an object of the invention to provide a picture display device comprising emission-reducing means which do not exhibit any Moir+e,fra e+ee effect and are preferably inexpensive.

According to the invention, the electrically conducting material is transparent. No Moiré effect occurs when a transparent material is used. Hitherto, non-transparent means, necessarily in a gauze shape, have been used. This non-transparent gauze exhibits the Moiré effect.

The transparent electrically conducting material preferably comprises a layer which is vapor-deposited on one of the glass plates. An advantage thereof is that these emission-reducing means for the picture display device can easily be made and are therefore relatively inexpensive. If desired, the layer may also be provided on both plates.

In accordance with a further embodiment, the vapor-deposited layer is a continuous layer. A layer of this type is easier to provide.

In accordance with a preferred embodiment of the invention, the vapor-deposited continuous layer includes a metal. It has surprisingly been found that such a layer also shields infrared radiation. This embodiment is particularly suitable for use in a plasma display. In operation, this type of display produces strong electromagnetic fields and emits much infrared radiation, which has very detrimental effects on persons in the neighborhood of the display.

Preferably, polyvinyl butyral (PVB) is present between the glass plates. The glass plates may be secured together with this material by means of heating and vacuum suction. The use of such a layer is an additional advantage when the electrically conducting material is a vapor-deposited layer. Such layers are generally very thin and the PVB protects the vapor deposited layer against damage. If the layer is not to be exposed to oxygen, the PVB also provides a satisfactory protection against this oxygen.

The conducting material preferably comprises silver and tin oxide. This material has satisfactory electrically conducting properties and is readily available.

If, in addition to a part with conducting material between the glass plates, the emission-reducing means also comprise another conducting part and if this part must be connected in a conducting manner to the conducting material between the glass plates (for example, for forming a Faraday cage), then this connection is preferably formed by means of a metal strip. This strip is partly present between the glass plates where it makes contact with the conducting layer. The projecting part is connected to the rest of the emission-reducing means.

The emission-reducing means includes a shield which comprises two substantially parallel glass plates enclosing a thermoplastic material and an electrically conducting material, the electrically conducting material being transparent. The advantage of accommodating the transparent emission-reducing means in a separate shield is that it is usable for general purposes. A standard shield may be produced, which shield may subsequently be built into the cabinets of various types of picture display devices.

These and other aspects of the invention are apparent from and will be elucidated with reference to the embodiments described hereinafter.

DESCRIPTION OF THE PREFERRED EMBODIMENTS

Figure 1:
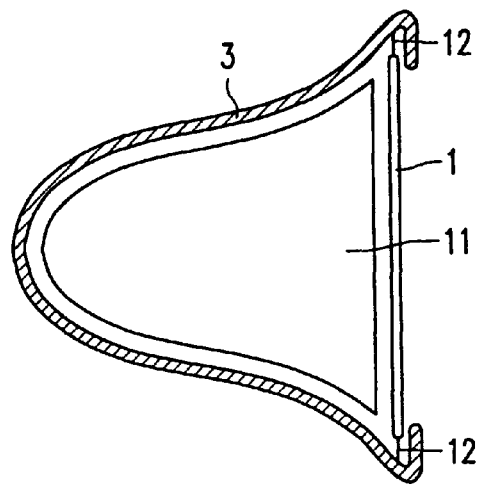
FIG. 1 is a diagrammatic longitudinal section of a picture display device with a cathode ray tube, provided with emission-reducing means.

FIG. 1 is a diagrammatic longitudinal section of a picture display device with a cathode ray tube, provided with emission-reducing means. This picture display device comprises a cathode ray tube (11) and an emission-reducing shield (1) in a cabinet (3). The cabinet (3) may comprise a conducting layer which, together with the conducting layer in the emission-reducing shield, constitutes the emission-reducing means. These two layers may be interconnected in a conducting manner by a metal strip (12) and constitute a closed space, also called Faraday cage. For the sake of clarity, all components which are not relevant in this case have been omitted.

Figure 2:
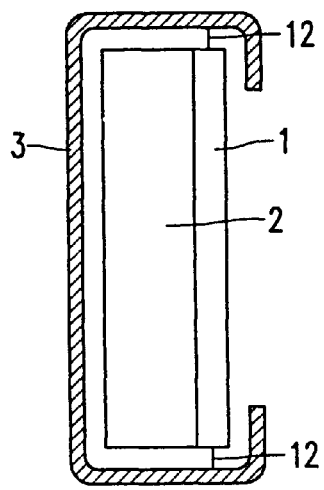
FIG. 2 is a diagrammatic longitudinal section of a plasma display provided with emission-reducing means.

FIG. 2 is a diagrammatic longitudinal section of a plasma display provided with emission-reducing means. This display comprises a plasma display panel (2) and an emission-reducing shield (1) accommodated in a cabinet (3). The cabinet (3) may comprise a conducting coating which, together with a conducting coating in the emission-reducing shield, constitutes the emission-reducing means. These two layers may be interconnected in a conducting manner and constitute a closed space, also called a Faraday cage. For the sake of clarity, all components which are not relevant in this case have been omitted.

Figure 3:
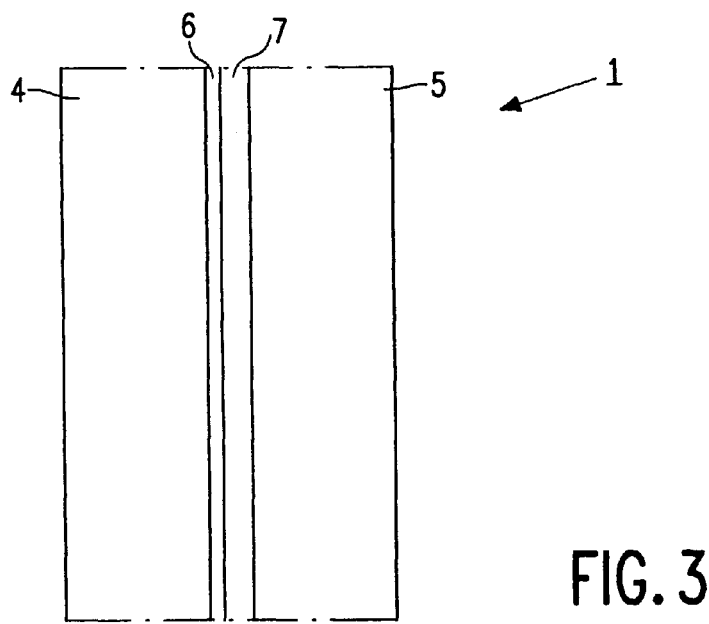
FIG. 3 shows a part of a diagrammatic cross-section of an embodiment of emission-reducing means according to the invention.

FIG. 3 shows a part of a diagrammatic cross-section of an embodiment of emission-reducing shield according to the invention. A thermoplastic layer (7) of PVB is present between two glass plates (4, 5). A conducting layer (6) is vapor-deposited on one of the glass plates (4). The glass plates may have a thickness of, for example 2.8 mm and 1.2 mm, respectively. The PVB layer may have a thickness of 0.76 mm. The vapor-deposited layer has a much smaller thickness.

Figure 4:
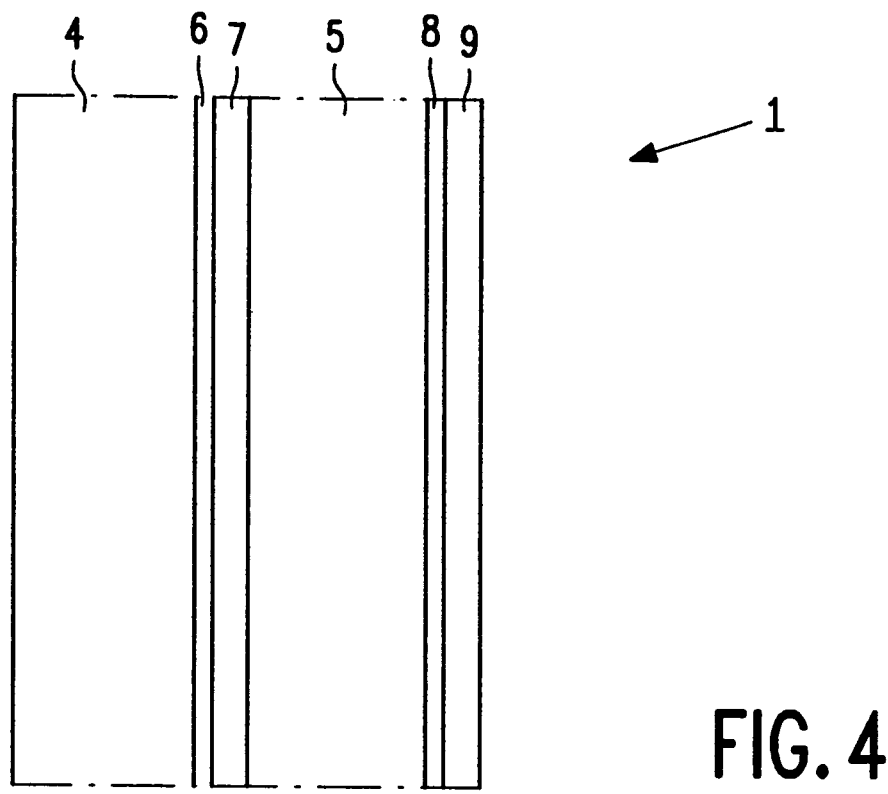
FIG. 4 shows a part of a diagrammatic cross-section of an embodiment of emission-reducing means according to the invention, provided with an anti-reflection coating and an anti-static coating.

FIG. 4 shows a glass plate (5) with an anti-reflection coating (8) and an anti-static coating (9). The panel in question had the following properties:

surface area of 997×597 mm thickness of 3–4 mm (chemically) cured glass or security glass metal layer with a resistance per square of approximately 3Ω/□ grounded by metal contact all round infrared radiation (800–1000 nm) of less than 10% screening at the edge by rim of paint on the glass reflection of approximately 2.5% visual transmission of approximately 70–75% heat resistance up to 80° C.

The embodiments may of course have alternative dimensions. By varying the composition, other properties may also be obtained.

Figure 5:
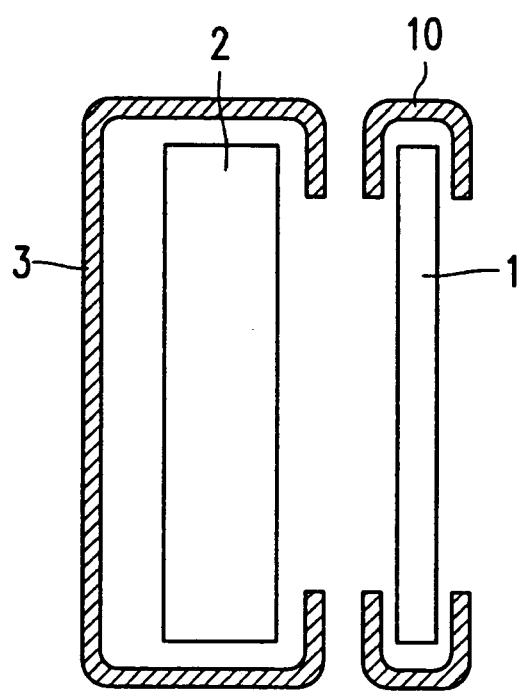
FIG. 5 is a diagrammatic longitudinal section of a picture display device with a separate shield.

FIG. 5 is a diagrammatic longitudinal section of a picture display device with a separate shield. A picture display panel (2) is accommodated in a cabinet (3). An emission-reducing shield (1) in a frame (10) is placed in front of the cabinet. For the sake of clarity, all components which are not relevant in this case have been omitted.

In summary, the invention relates to an emission-reducing shield for a display, comprising two glass plates. A conducting layer is present on one of the glass plates. The layer is transparent so that there is no Moiré effect. The shield may also have an anti-static coating and an anti-reflection coating.

I claim:

1. A picture display device provided with an emission-reducing shield comprising two substantially parallel glass plates enclosing a thermoplastic material and a continuous layer of electrically conducting material, wherein the electrically conducting material is transparent.

2. A picture display device as claimed in claim 1, characterized in that the transparent electrically conducting material is vapor-deposited on at least one of the glass plates.

3. A picture display device as claimed in claim 1, characterized in that the conducting material comprises a metal.

4. A picture display as claimed in claim 3, characterized in that the electrically conducting material comprises a mixture of silver and tin oxide.

5. A picture display device as claimed in claim 3, characterized in that the picture display device is a plasma display.

6. A picture display device as claimed in claim 1, characterized in that the thermoplastic material consists essentially of polyvinyl butyral (PVB).

7. A picture display device as claimed in claim 1, further comprising a cabinet having a conducting layer, characterized in that the electrically conducting material is secured to the conducting layer by means of a metal strip.

8. A shield with emission-reducing means which are suitable for use in a picture display device, said emission reducing means comprising two substantially parallel glass plates enclosing a thermoplastic material and a continuous layer of electrically conducting material, the electrically conducting material being transparent.

9. A shield as claimed in claim 8, characterized in that the electrically conducting material is vapor-desposited on at least one of the glass plates.

\* \* \* \* \*